(12) United States Patent
Gerardi et al.

(10) Patent No.: US 9,235,838 B2
(45) Date of Patent: Jan. 12, 2016

(54) SYSTEM AND METHOD FOR SECURE DOWNHOLE INTELLIGENT COMPLETIONS

(75) Inventors: Paul D. Gerardi, Danbury, CT (US);
Valery Polyakov, Brookline, MA (US);
Terizhandur S. Ramakrishnan, Bethel, CT (US); Bertrand du Castel, Austin, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1477 days.

(21) Appl. No.: 11/759,321

(22) Filed: Jun. 7, 2007

(65) Prior Publication Data
US 2008/0162357 A1    Jul. 3, 2008

Related U.S. Application Data

(60) Provisional application No. 60/882,667, filed on Dec. 29, 2006.

(51) Int. Cl.
*G06Q 20/00* (2012.01)
*G06Q 20/38* (2012.01)
*G06Q 50/06* (2012.01)
*E21B 34/16* (2006.01)
*G06Q 20/20* (2012.01)
(Continued)

(52) U.S. Cl.
CPC .......... *G06Q 20/38215* (2013.01); *E21B 34/16* (2013.01); *G06Q 20/206* (2013.01); *G06Q 50/06* (2013.01); *H04L 9/321* (2013.01); *H04L 9/3263* (2013.01); *E21B 34/00* (2013.01)

(58) Field of Classification Search
CPC ....... G06F 1/24; G06F 3/0613; G06F 3/0638; G06F 3/0676; G06F 9/4401; G06F 9/4406; G06F 9/445; G06F 11/1417; G06F 11/1433; G06F 8/65; G06F 1/26; G06F 12/0802; G06F 21/00; G06F 21/50; G06F 21/57; G06F 21/575; G06F 21/60; H04L 47/80; H04L 67/28; H04L 67/32; E21B 43/12; E21B 43/14; E21B 47/102; G06Q 20/206
See application file for complete search history.

(56) References Cited

U.S. PATENT DOCUMENTS 6,076,164 A  *  6/2000  Tanaka et al. ................. 713/185
6,823,454 B1 * 11/2004  Hind et al. .................... 713/168
6,854,009 B1 *  2/2005  Hughes ........................ 709/220

(Continued)

OTHER PUBLICATIONS

"How Computer Memory Works," HowStuffWorks, as archived by the Internet Archive WayBack Machine on Oct. 13, 2005, available at: https://web.archive.org/web/20051013105229/http://computer.howstuffworks.com/computer-memory.htm/printable.*

(Continued)

*Primary Examiner* — Calvin L Hewitt, II
*Assistant Examiner* — Mohammad A Nilforoush

(57) ABSTRACT

A flow control apparatus for controlling fluid flow in a petroleum reservoir. The flow control apparatus has a flow control mechanism, a controller operable to control the flow control mechanism to adjust fluid flow through the flow control mechanism, the controller comprising a processor operable to execute according to a control algorithm, and a non-volatile memory connected to the controller. The non-volatile memory includes instructions to cause the controller to execute an authentication mechanism operable to authenticate a control computer and to prevent operation of the controller until the authentication mechanism authenticates the control computer.

20 Claims, 12 Drawing Sheets

(51) Int. Cl.
*H04L 9/32* (2006.01)
*E21B 34/00* (2006.01)

(56) References Cited

U.S. PATENT DOCUMENTS

| | | | | |
|---|---|---|---|---|
| 7,237,255 | B2* | 6/2007 | Fransdonk | 726/3 |
| 2002/0088620 | A1* | 7/2002 | Lerche et al. | 166/297 |
| 2005/0108571 | A1 | 5/2005 | Lu et al. | |
| 2005/0283826 | A1* | 12/2005 | Tahan | 726/2 |
| 2007/0220500 | A1* | 9/2007 | Saunier | 717/162 |

OTHER PUBLICATIONS

"How Caching Works," HowStuffWorks, as archived by the Internet Archive WayBack Machine on Jan. 17, 2006, https://web.archive.org/web/20060117012319/http://computer.howstuffworks.com/cache.htm/printable.*

Diffie et al., Authentication and Authentic Key Exchanges, Designs, Codes and Cryptography, vol. 2, pp. 107-125, 1992.

Diffie et al., New Directions in Cryptography, IEEE Transactions on Information Theory, vol. IT-22, No. 6, pp. 644-654, 1976.

Needham et al., Using Encryption for Authentication in Large Networks of Computers, Communications of the ACM, vol. 21, No. 12, pp. 993-999, 1978.

Rivest et al., A Method for Obtaining Digital Signatures and Public-Key Cryptosystems, Communications of the ACM, vol. 21, No. 2., pp. 120-126, 1978.

Ramakrishnan, On Reservoir Fluid-ow Control with Smart Completions, SPE 84219, pp. 1-11, 2003.

Polyakov et al., Web Based Evaluation, Design and Updating of a Reservoir Control System, SPE 90911, pp. 1-8, 2004.

Ramakrishnan, On Reservoir Fluid-Flow Control With Smart Completions, SPE 84219, pp. 4-12, 2007.

Koblitz, A Course in Number Theory and Cryptography, Springer-Verlag, 2nd Edition, New York, Chapter 3, pp. 55-186, 1994.

Ogunnaike et al., Process Dynamics, Modeling, and Control, Topics in Chemical Engineering, Oxford University Press, New York, Chapter 11, pp. 333-555, 1994.

Coughanowr, Process Systems Analysis and Control, Second Edition, McGraw-Hill,lnc., Chapter 16, pp. 201-245, 1991.

\* cited by examiner

SYSTEM AND METHOD FOR SECURE DOWNHOLE INTELLIGENT COMPLETIONS

CROSS REFERENCE TO RELATED APPLICATIONS

This application claims the benefits of priority from Provisional Patent Application No. 60/882,667, entitled "SYSTEM AND METHOD FOR SECURE DOWNHOLE INTELLIGENT COMPLETIONS," filed in the United States of America on Dec. 29, 2006, which is commonly assigned to assignee of the present invention and hereby incorporated by reference in its entirety.

TECHNICAL FIELD

The present invention relates generally to control of fluid flow in petroleum reservoirs and more particularly to establishing secure communication connection for intelligent completions equipment.

BACKGROUND OF THE INVENTION

In modern petroleum fields, fluid flow is controlled using downhole valves known as intelligent completions. An intelligent completion is a variable orifice valve. These valves may be adjusted at will. Typically, intelligent completions are deployed to control flow resistances at various zones in a well or system of wells, which is illustrated in FIG. 1. Generally, the aim is to deploy a combination of valves and sensors in the various production zones of a well to adjust flow distributions along the well-bore, either to achieve a desired fluid-front movement or to maintain a desired production or for conformance. The control strategy may be designed based on either pressure or flow-rate control. A detailed discussion of control strategies based on intelligent completions may be found in T. S. Ramakrishnan, "On reservoir Fluid-Flow with Smart Completions", SPE84219, SPE Annual Technical Conference and Exhibition, 2003, which is entirely incorporated herein by reference.

Intelligent completion valves may be controlled from surface equipment or from controllers deployed in the downhole equipment. Other components are sensors for measuring pressure or flow-rate computer based controllers. Using a control algorithm in response to measured values, control the pressure or flow-rate by manipulating the valves to achieve a desired set point. The control algorithm, which is usually a feed-back controller, accepts a measured value as input and adjusts the valves in an effort to move the measured value towards the desired set point.

Usually control systems are designed for stability using a variety of methods, for example, those discussed in Process Dynamics, Modeling and Control by B. A. Ogunnake, W. H. Ray, 1994 and Process Systems Analysis and Control by Coughanowr, D. R., 1991. Downhole flow control is not amenable to standard linear theories. Therefore, the control system hardware used with a particular formation is designed based on simulations with the objectives of robustness and stability. After the control system has been deployed downhole to adjust flow within a formation, the control algorithm may be updated from the surface equipment or even remotely. The updates may include changing control parameters such as update time and sensitivity, for example, in response to measured production and injection data. A detailed discussion of intelligent completion systems may be found in Ramakrishnan, T. S., "On reservoir fluid-flow control with smart completions", SPE Paper SPE84219, SPE Annual Technical Conference and Exhibition, 2003 (Society of Petroleum Engineers).

Any networked computer system is inherently vulnerable to security threats. In the oilfield, such threats are compounded by many factors, including their importance to national and international economies their high monetary value, and the expense associated with exploration, extraction and production equipment.

These factors also contribute to, at least, the following specific threats to intelligent completion systems:
Unauthorized operation of an intelligent completions installation
Use of unauthorized equipment with an intelligent completions control system
Theft of intelligent completions systems
Theft of proprietary parameter settings and algorithms used to control an intelligent completions system From the foregoing, it will be apparent that there is a need for an improved method to secure intelligent completions systems thereby overcoming foresaid security risks.

SUMMARY OF THE INVENTION

A preferred embodiment of the invention utilizes a flow control apparatus having an authentication mechanism to authenticate a control computer to safeguard against security risks to which a flow control apparatus may be exposed.

An embodiment of the invention provides for a flow control apparatus for controlling fluid flow in a petroleum reservoir that has a flow control mechanism controlled by a controller operable to control the flow control mechanism to adjust fluid flow through the flow control mechanism. The controller has a processor operable to execute a control program according to a control algorithm and a non-volatile memory connected to the controller storing instructions to cause the controller to execute an authentication mechanism operable to authenticate a control computer and to prevent operation of the controller until the authentication mechanism authenticates the control computer.

The authentication mechanism may use a secret key to verify the authenticity of the control computer or may use a public key of a certificate authority to verify that a digital certificate was signed using the private key of the certificate authority. In the latter embodiment, the authentication mechanism has a logic to exchange digital certificates with the control computer and to verify that the digital certificate received.

In an embodiment of the invention, the control computer has a parameter storage and a logic to update parameter values. The control program prevents updates to the parameter values until the authentication mechanism has authenticated the control computer. The authentication mechanism may further operate to verify a completions operator and to prevent operation of the parameter update logic until the authentication mechanism has authenticated the completions operator.

In an embodiment, the authentication mechanism is preprogrammed with an identifier for an authorized control computer and the authentication mechanism verifies that the control computer corresponds to the authorized control computer.

In a further embodiment of the invention, the non-volatile memory stores a portion of a control program operable to cause the processor to execute according to the control algorithm. However, the complete control program also includes a second portion. The control apparatus cannot function without having the second portion loaded into the volatile memory. To accomplish that, the first portion of the control program contains a second-portion loading logic operable, in response to a condition of the second portion not being present in the volatile memory, to use a cryptographic engine to decrypt the second portion and to load the second portion from the control computer into the volatile memory. In one embodiment, the second portion cannot be loaded until the authentication mechanism has authenticated the control computer and/or the completions operator.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
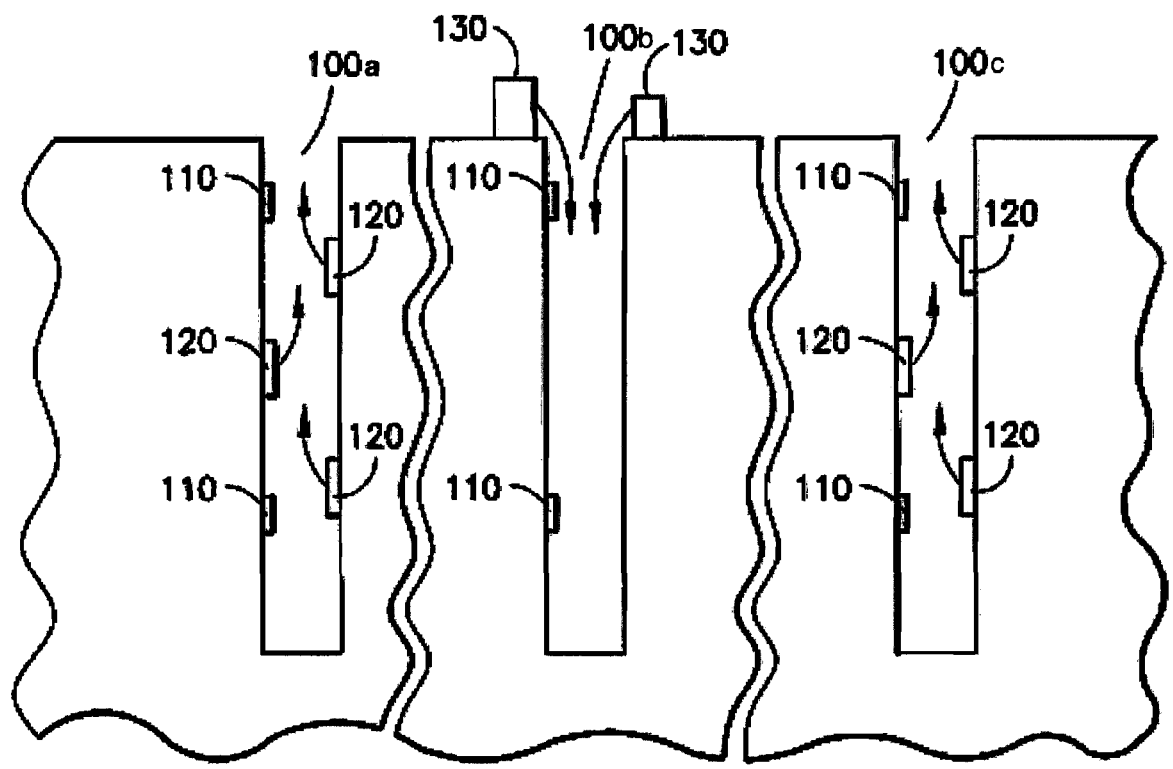
FIG. 1 is a schematic illustration of a cross-section of a system of wells in which intelligent completions are used to control fluid flow.

In the following detailed description reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

A secure intelligent completions system according to the invention establishes a chain of trust between a completions operator, a control computer, and downhole intelligent completions equipment. By deploying such a secure intelligent completions system, oilfield operators may avoid security threats such as theft of equipment and/or proprietary algorithms, unauthorized control of intelligent completions systems, and use of unauthorized control equipment or unauthorized downhole equipment.

FIG. 1 is a schematic illustration of a cross-section of a system of wells in which intelligent completions are used to control fluid flow. Once a production strategy has been chosen, a reservoir may be put into production using a system of wells 100 consisting of two producer wells 100a and 100c and an injector well 100b. In FIG. 1, flow rate and pressure sensors 110 are deployed in the well, for example, in the casing. In an alternative embodiment the sensors are suspended into the wells or included with production logging tools run periodically in the wells. Furthermore, controllable pumps 130 are placed in the injector well 100b.

Fluid flow from the reservoir into the wells is controlled by control valves 120 deployed in the producer wells 100a and 100c. Using the control valves 120, the fluid flow from the reservoir into the well may be controlled on a zone-by-zone basis. Such fluid flow control may be used to implement a particular production strategy or in an effort to optimize production from a reservoir, often with the goal to adjust flow distributions along the well-bore to control fluid-front movement.

Typically, the control of the valves 120 is accomplished using a feedback loop algorithm of some type in which flow is measured by the sensors 110. The observed sensor value is compared to a set point and an appropriate adjustment of the control valve 120 is performed. The deployment may contain either fluid flow-rate sensors or pressure sensors, depending on the desired control value. In an alternative embodiment, a mix of fluid flow-rate sensors and pressure sensors may be encountered.

Figure 2:
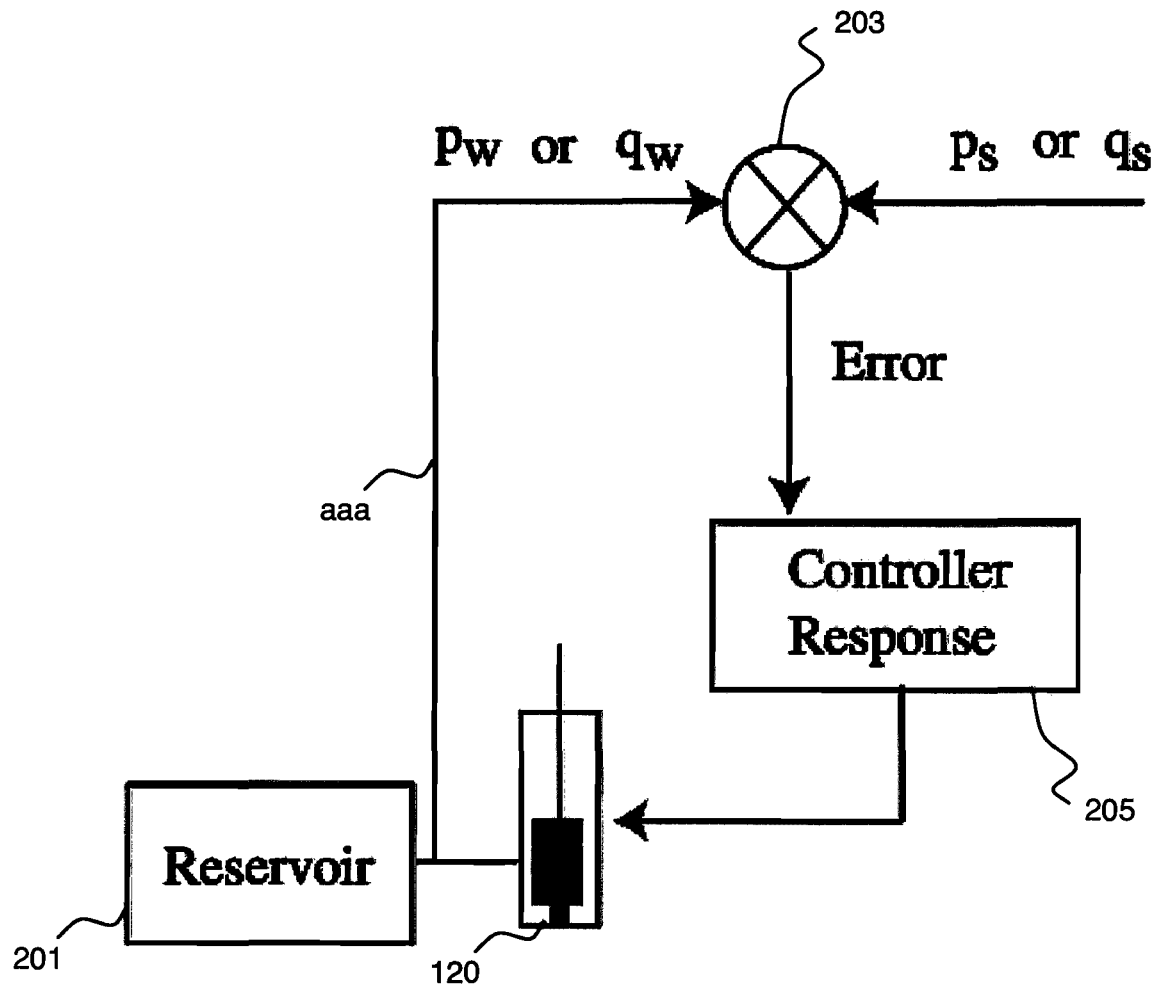
FIG. 2 is a schematic illustration of a feedback loop for setting a particular valve.

FIG. 2 is a schematic illustration of a feedback loop for setting a particular valve 120. During the production of fluid from a reservoir 201 a sensor 110, corresponding to the valve 120, measures either pressure, $p_w$, or flow-rate, $q_w$. A comparison 203 is made between the measured value and the desired set point, $p_s$ or $q_s$, respectively, to determine an error (e.g., $p_s$-$p_w$) between the measured value and the set point value. This error is used as an input to a controller algorithm to determine a response 205. That controller response 205 is fed back into the valve 120 to adjust the valve 120.

A controllable valve is a valve that may be adjusted to a particular setting, typically the stem height h. Thus, the controller response 205 may be a change in that stem height, i.e., $\Delta h$. Adjustment may be according to a particular algorithm, e.g., an I-controller which (for electrical valves) may be of the form:

$$\frac{dh}{dt} \approx \frac{\Delta h}{\Delta t} - \text{sgn}(p_s - p_w)k_I|p_s - p_w|^\gamma \qquad (1)$$

where h is stem height (or height of the open interval), $\Delta t$ is the update time (which may be arbitrarily larger than the integration time step), $p_s$ is the well pressure for the layer of interest, $k_I$ is the integral control constant, and $\gamma$ is the sensitivity exponent. Other algorithms may be useful in establishing adjustments to a controllable valve 120.

Figure 3:
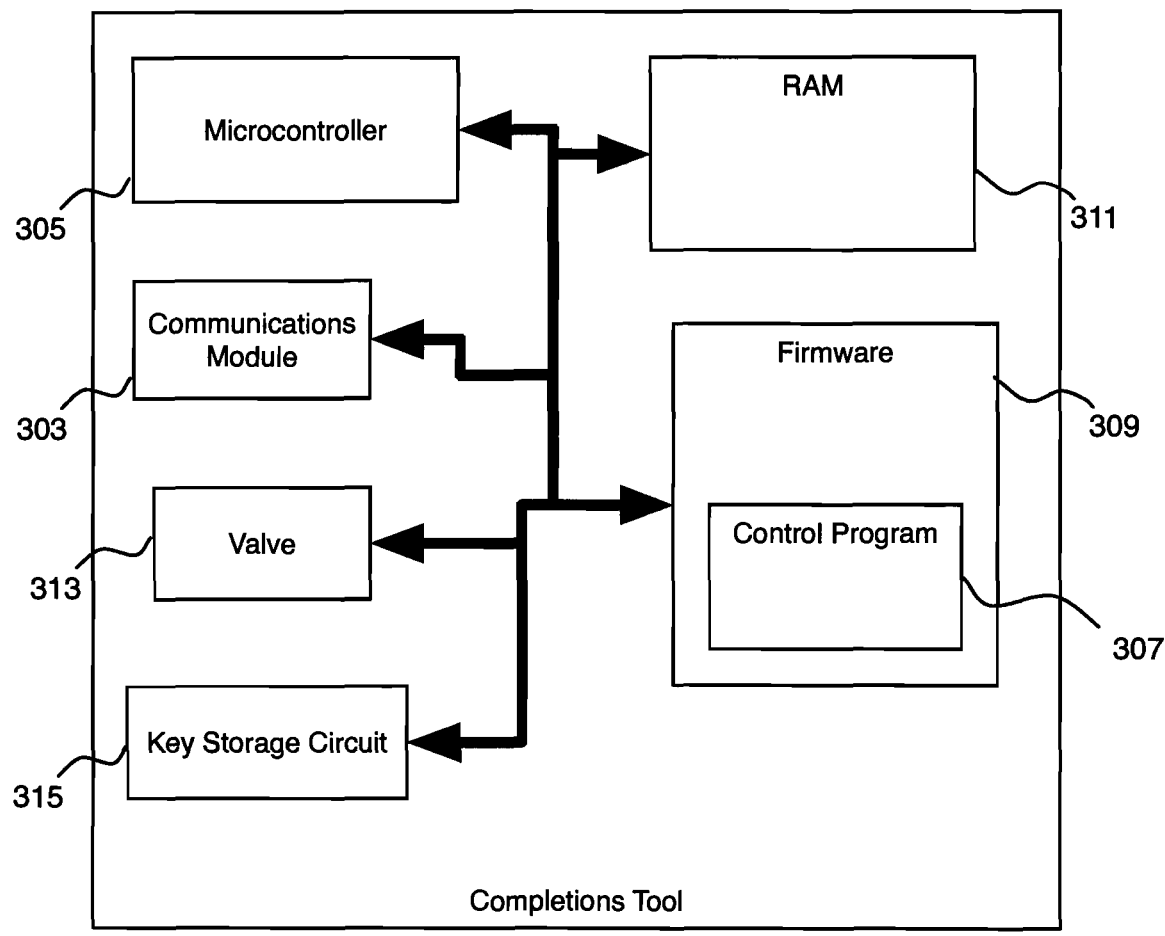
FIG. 3 is a block diagram illustrating the architecture of one embodiment of an intelligent completions tool.

FIG. 3 is a block diagram illustrating the architecture of one embodiment of an intelligent completions tool 301. A communications module 303 is connected to a network (not shown) and may obtain sensor data from a sensor 110 (also not shown) and control parameters from a control computer (not shown). Input and output data communicated via the communications module 303 is processed by a microcontroller 305. The operations of the microcontroller 305 are controlled by a control program 307 typically stored in firmware storage 309, e.g., EEPROM. The control program 307 may implement a control algorithm as set out in Equation (1) or some other control algorithm.

The intelligent completions tool 301 may also contain a key storage circuit 315, which is discussed further below, and is a secure hardware circuit where a digital key pair of the intelligent completions tool 301 may be stored, thus providing electrical, logical and physical protection.

The intelligent completions tool 301 may require temporary storage of parameters or other data. The microcontroller 305 may store those parameters and other data in the random access memory (RAM) 311.

The main purpose of the intelligent completions tool 301 is to control fluid flow by controlling an adjustable valve 313. Using data received via the communications module, and applying a control algorithm stored in the form of the control program, the microcontroller 305 sends control signals to the valve 313. These control signals operate to either increase or decrease valve flow.

Many different types of valves may be used, e.g., electrical valves, bi-directional or reversible mechanical valves, and irreversible valves. The latter include cyclical valves of which there are at least two types, namely, valves which go to a full-open or full-closed position and then reverse and valves for which the step after the fully open position is fully closed. The control algorithm shown in Eq 1 may be applied to, for example, an electrical valve, which is infinitely adjustable.

Typically, the valves are characterized experimentally so that a control program 307 can implement a control algorithm designed to effect flow rate in a predictable manner. Further details of control algorithms may be found in Ramakrishnan, T. S., "On reservoir fluid-flow control with smart completions", SPE Paper SPE84219, SPE Annual Technical Conference and Exhibition, 2003 (Society of Petroleum Engineers) which is incorporated herein by reference in its entirety.

Figure 4:
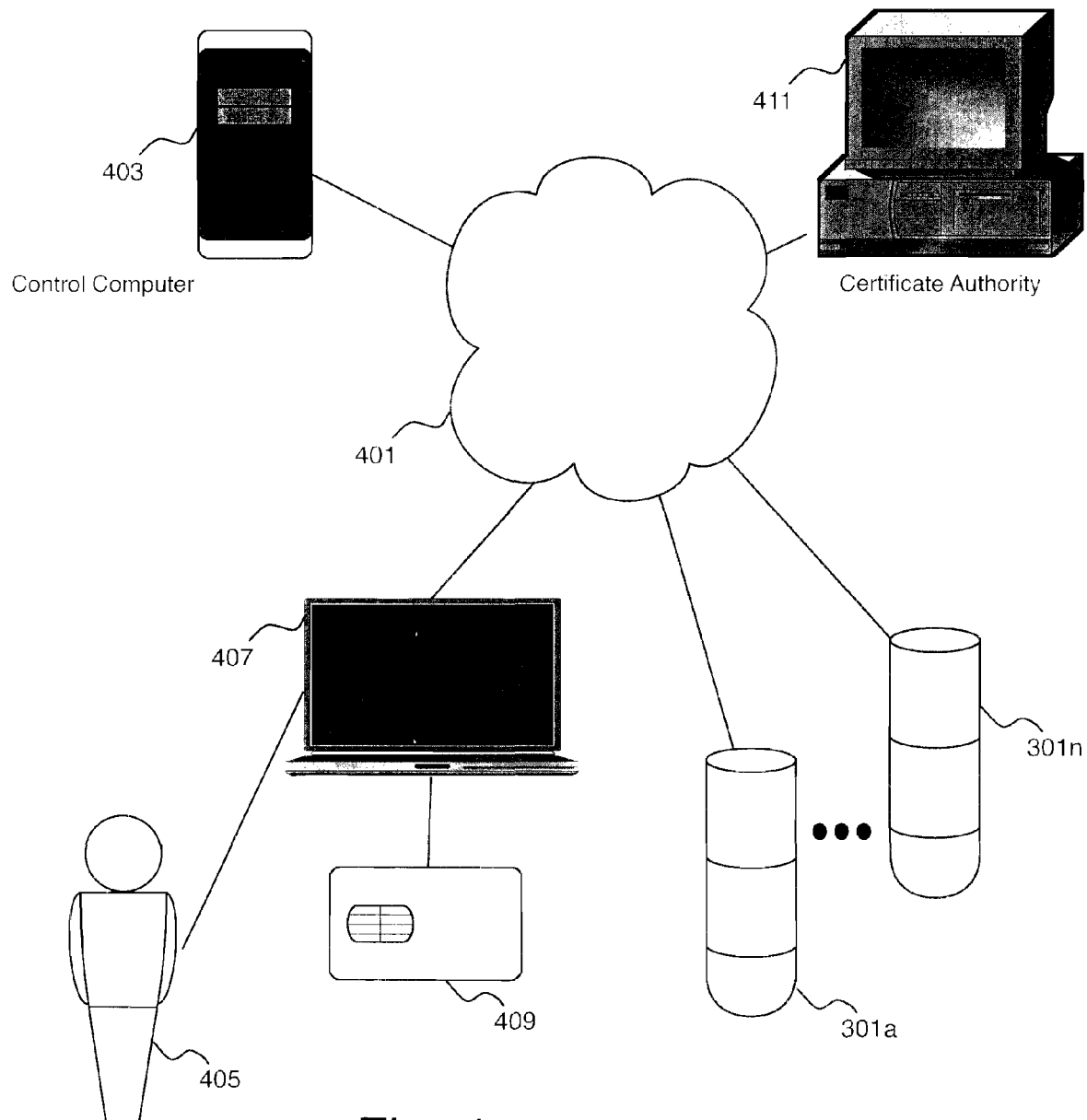
FIG. 4 is a schematic illustration showing one possible deployment of several completions tools in which security is enhanced by the establishment of a chain of trust.

To address the aforementioned security threats, the intelligent completions tool 301 is deployed in a system in which a chain of trust is established between the intelligent completions tool 301, a control computer and a completions operator. FIG. 4 is a schematic illustration showing one possible deployment of several completions tools 301*a*-301*n* in which security is enhanced by the establishment of such a chain of trust.

In the system illustrated in FIG. 4, secure communication is accomplished using a trust infrastructure. An actual deployment of an intelligent completions system typically includes simultaneous use of many intelligent completions tools 301 throughout an oil field. Furthermore, while the present invention is primarily described in the context of an intelligent completions system, the security scheme described herein may be extended to other sensitive components of the oilfield system, e.g., injector pumps.

The trust infrastructure of a preferred embodiment is based on authentication and encryption technologies, which in turn rely on a public or private key management base. In a preferred embodiment, the security system is based on the public key/private key (also called public key cryptography or asymmetric cryptography.) Alternative embodiments include secret key cryptography, also called symmetric cryptography.

A network 401 connects the intelligent completions tool 301 to a control computer 403. The control computer 403 may be a Web server that provides a user interface to a completions operator 405 who is connected to the network 401 via a personal computer 407. Alternatively a completions operator 405 operates the control computer 403 directly.

Through the user interface provided by the control computer 403, the completions operator 405 may control the intelligent completions tools 301. For example, the completions operator may set particular parameters that are used by the control program 307, e.g., control loop parameters. The completions operator 405 may further take direct control of the completions tools 301, e.g., overriding the control program 307 by shutting off or opening a valve.

The control computer contains storage for control programs which may be downloaded by the completions operator 405 to the intelligent completions tools 301.

In one embodiment, security of the intelligent completions tools 301 and the overall completions system is enhanced further through the use of a smart card 409 associated with each completions operator 405. As is discussed in greater detail below, all or several operations by a completions operator 405 require the use of the smart card 409. Such operations can include logging into the control system 403 and starting or turning off intelligent completions tools 301. Furthermore, cryptographic functions may be implemented on the smart card 409.

The network 401 further connects the control computer 403, the completions operator 405, the smart card 409, and the intelligent completions tools 301 to a certificate authority 411.

A preferred embodiment relies on public, also known as asymmetric key cryptography. Public key cryptography employs a pair of keys. Only one key, called the private key, needs to be kept secret and is for the exclusive use of the key-pair owner. The other, called the public key, is made available to others that need to engage in secure communications with the key-pair owner. The keys are related such that actions (e.g. digital signing and data encryption) which are done with one key can only be verified or undone by the other key of the key-pair. The Diffie-Hellman algorithm allows the use of such public and private keys for encryption and decryption, but is vulnerable to attack in transmission. This is overcome by the Diffie, van Oorschot and Wiener algorithm (Diffie and Hellman, "New Directions in Cryptography", *IEEE Transactions on Information Theory*, 1976, and W. Diffie, P. C. van Oorschot and M. J. Wiener, "Authentication and Authenticated Key Exchanges", *Designs, Codes and Cryptography* 2, 107-125, Kluwer Academic Publishers (1992). The Rivest-Shamir-Adleman (RSA) algorithm is an alternative public key encryption algorithm that deploys pairs of private and public keys (R. Rivest, A. Shamir, L. Adleman, "A Method for Obtaining Digital Signatures and Public-Key Cryptosystems," *Communications of the ACM*, Vol. 21 (2), pp. 120-126. 1978.). The RSA algorithm offers both encryption and signature, and is a widely practiced standard. A preferred embodiment employs the RSA algorithm as the basis here. However, any equivalent algorithm, e.g., Diffie-Hellman and elliptic curve cryptography (ECC), with public and private keys and authentication can be used.

Alternatively, a secret key mechanism may also suffice. However, such embodiments would include a key (or other authentication means) distribution mechanism and would create more complexities in the deployment of the system. A private key-based system includes a trusted distribution of the private keys. An example of such a mechanism is the Kerberos protocol (Roger Needham and Michael Schroeder. "Using encryption for authentication in large networks of computers". *Communications of the ACM*, 21(12), December 1978.)

Further discussion of cryptography may be found in N. Koblitz, *A Course in Number Theory and Cryptography*, Springer Verlag, 1994.

Returning now to FIG. 4, the trust relationship among the completions operator 405, the control computer 403 and the intelligent completions tools 301 is managed through a Public Key Infrastructure (PKI) that integrates public key cryptography with a Certificate Authority (CA) 411. The CA 411 is trusted by all involved parties. Each entity—the completions operator 405, the control computer 403 and the intelligent completions tool 301—registers separately with the CA 411.

Generally speaking, each entity uses its private key to send a signed request, along with its public key, to the CA 411, requesting certified credentials it can subsequently use to identify itself to others. The CA 411 verifies that the signed request is authentic, i.e., truly generated by the entity that purportedly made the request, by using the public key of that entity. Upon verification, the CA 411 combines the public key of the entity with other information that uniquely identifies the entity, including the expiration date for the information. The CA 411 then signs this combined information using the private key of the CA 411. The resulting signed structure is called a public key certificate or a digital certificate and binds information identifying the owner of the certificate, e.g., one of the control computers 403, the completions operator 405, or the intelligent completions tools 301, to the public key of the CA 411. Any attempt to modify the content of a digital certificate invalidates the certificate via the information contained in the signature. The information contained in the certificate becomes suspect and therefore not trusted.

The CA 411 transmits the digital certificate to the requesting entity. The requesting entity can subsequently present the digital certificate to others as proof of the entity's identity. All involved parties also receive the public key certificate of the CA 411. With the public key certificate of the CA 411, an entity can verify the signature of the CA (which was performed with the private key of the CA 411) on each of the digital certificates.

In addition to registering the entities, generating and signing digital certificates, the CA 411 maintains a revocation list. These are revoked certificates, i.e., the certificates of entities no longer valid. Digital certificates are expected to be valid until expiration. However, digital certificates may be revoked at any time. Examples of reasons for revocation include dismissal or transfer of a completions operator, loss or compromise of an entity's private key, or shutdown of a completion system.

Figure 5:
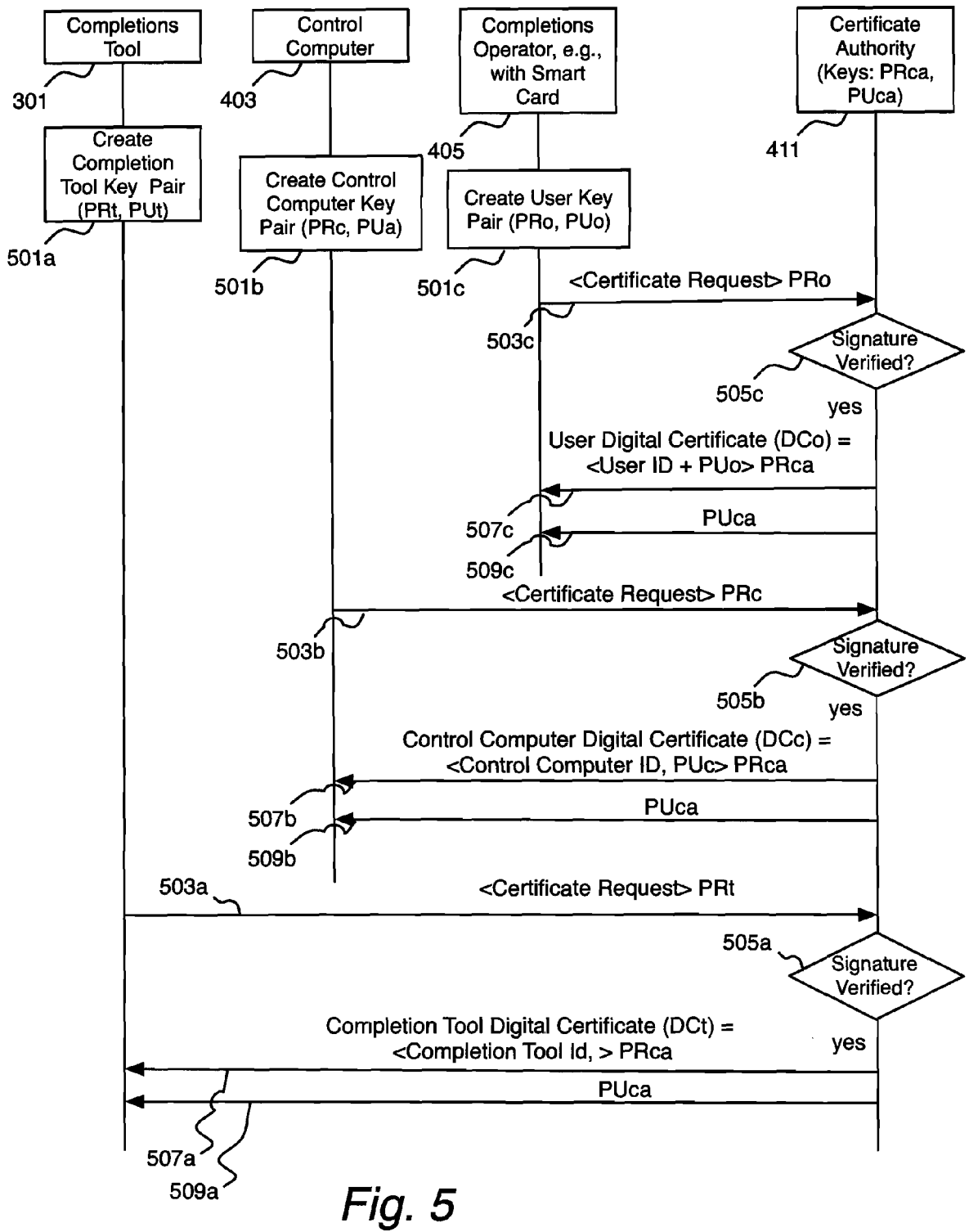
FIG. 5 is a timing sequence diagram illustrating establishment of identities, including creation of relevant digital certificates in an intelligent completions system according to the invention.
Figure 6:
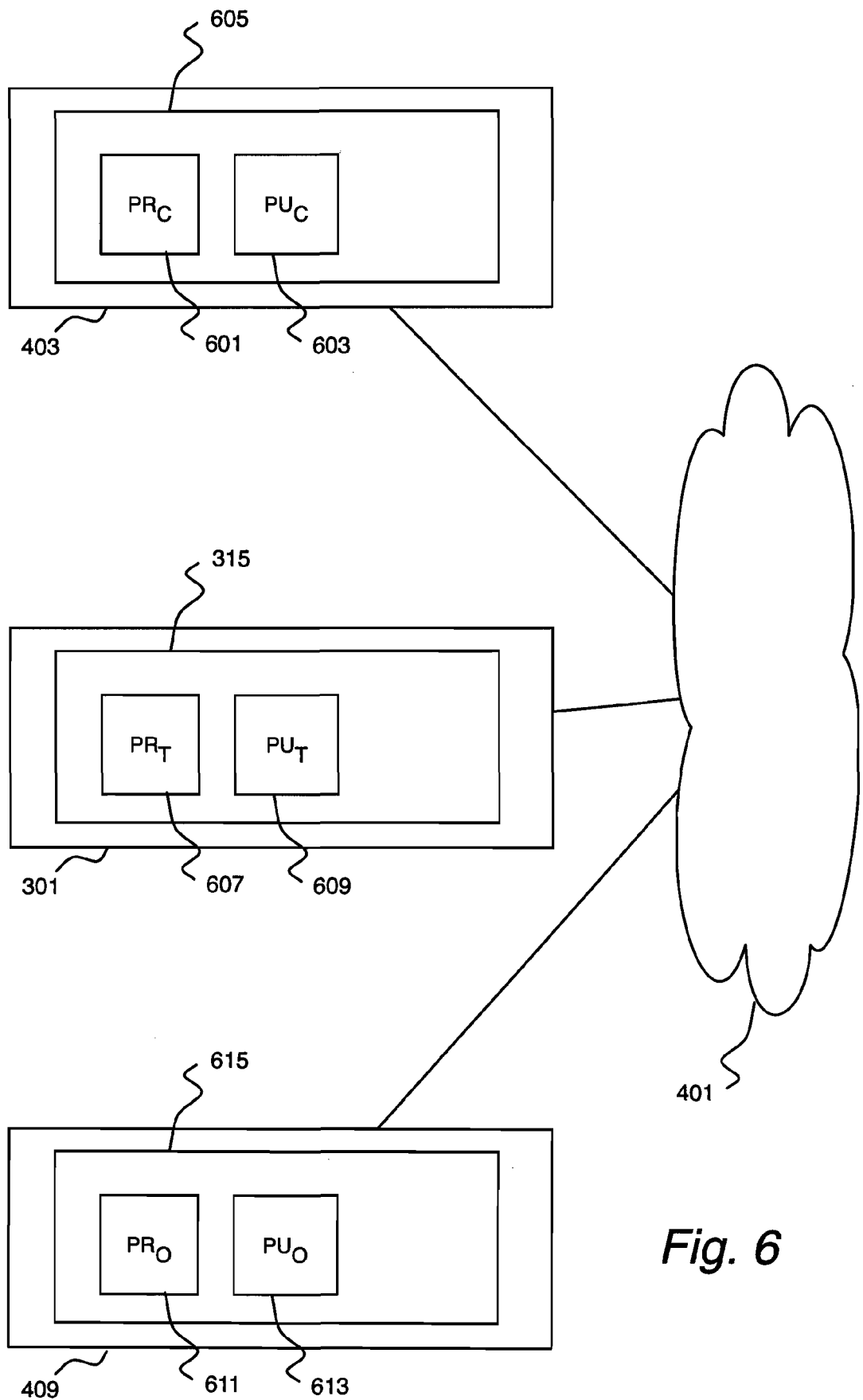
FIG. 6 is a block diagram illustrating the storage of key pairs in the control computer, the intelligent completions tool, and the smart card introduced in FIG. 4.

FIG. 5 is a timing sequence diagram illustrating establishment of identities, including creation of relevant digital certificates in an intelligent completions system according to the invention. Each of the completions tool 301, the control computer 403, and the completions operator 405 establishes a public key/private key pair, steps 501*a-c*, respectively. FIG. 6 is a block diagram illustrating the storage of key pairs in the control computer 403, the intelligent completions tool 301, and the smart card 409. The key pair of the control computer 403, consisting of a private key ($PR_C$) 601 and a public key ($PU_C$) 603, may be encrypted and stored in a secure memory 605 in a manner requiring a user to enter a suitably strong password in order to make use of the key. The key pair of the intelligent completions tool 301, consisting of a private key ($PR_T$) 607 and a public key ($PU_T$) 609, may be preprogrammed and stored in a secure hardware circuit 315 (see FIG. 3) that is designed to provide electrical, logical and physical protection. The key pair, consisting of a private key ($PR_O$) 611 and a public key ($PU_O$) 613, of the completions operator 405 may be stored on the smart card 409 in a nonvolatile memory 615. The private keys are never exposed to the network or nodes on the network and remains under the control of the key owner.

Each of the completions tool 301, the control computer 403 and the completions operator 405 transmit a Certificate Request message 503*a*, 503*b*, and 503*c*, respectively, to the Certificate Authority 411. The Certificate Request messages 503 are signed by the entity's private key. For example, the Certificate Request message 503*a* of the intelligent completions tool 301 is signed by the intelligent completions tool 301 using the $PR_T$.

For each Certificate Request, the CA 411 verifies the signature of the requesting entity, steps 505*a*, 505*b*, and 505*c*, respectively. If the signature is verified to correspond to the purported entity, the CA 411 creates the digital certificate for the entity from the entity ID (e.g., User ID, Control Computer ID, or Completion Tool ID) and the public key of the entity ($PU_O$, $PU_C$, $PU_T$) and signs that result with the private key of the CA 411 ($PU_{CA}$). The CA 411 transmits these certificates (completions operator digital certificate (DCO), control computer digital certificate (DCC), and completions tool digital certificate (DCT)) to the completions operator 405 (or the smart card 409), the control computer 403, and the completions tool 301, respectively, steps 507*b*, 507*b*, and 507*a*.

The CA 411 also transmits the public key of the certificate authority ($PU_{CA}$) to each of the entities, steps 509*a*, 509*b*, and 509*c*.

Figure 7:
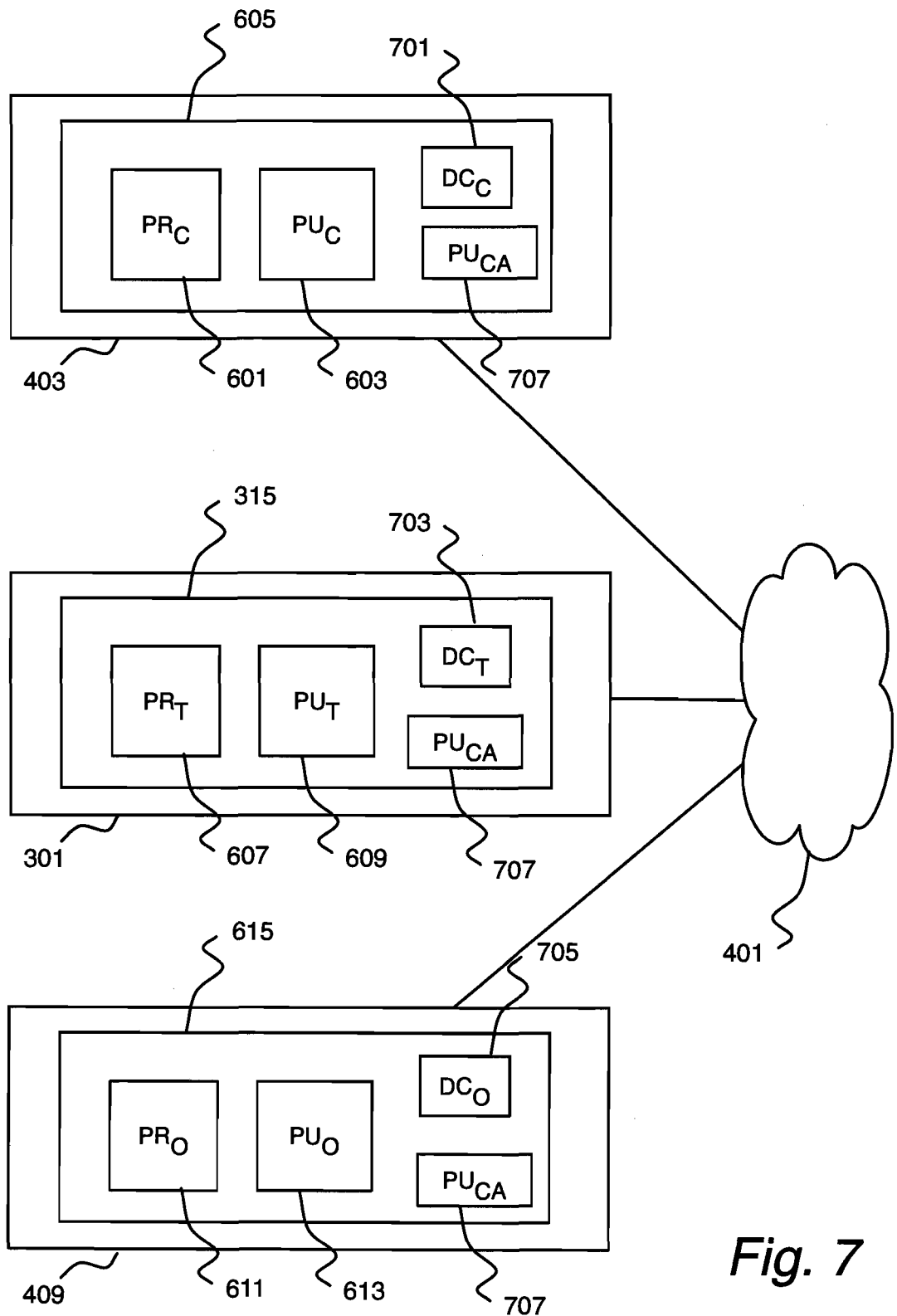
FIG. 7 is a block diagram illustrating the storage of digital certificates in the various components in a secure intelligent completions system.

FIG. 7 is a block diagram illustrating the storage of digital certificates DCC 701, DCO 705, and DCT 703 in the control computer 403, the smart card 409, and the intelligent completions tool 301, respectively, and the storage of the public key of the certificate authority ($PU_{CA}$) 707 in each of the control computer 403, the intelligent completions tool 301 and the smart card 409, respectively.

In operation, there is no need for constant or regular access to the CA 411 by the control computer 403, the smart card 409, and the intelligent completions tool 301. These entities store all the necessary information: private key, signed digital certificate and the public key of the CA 411. These entities mutually authenticate each other and establish a chain of trust among themselves without intervention by or communication with the CA. Access to the CA 411 revoked list is granted to these entities in order to allow them to check against the Certificate Revocation List (CRL) for revoked certificates. This Certificate Revocation List (CRL) allows the entities computer to prevent a chain of trust from being completed if any of the digital certificates involved are no longer valid. In addition, a predetermined message or signal can be programmed to notify the appropriate system administrator that an attempt to use an invalid digital certificate has been made, thus preventing further unauthorized attempted access.

Acquiring digital certificates for each of the completions operator 405, the control computer 403 and the intelligent completions tool 301 is only the first step in establishing secure communication between these entities. To complete the chain of trust, the control computer 403 mutually authenticates with both the completions tool 301 and the completions operator 405.

Figure 8A:
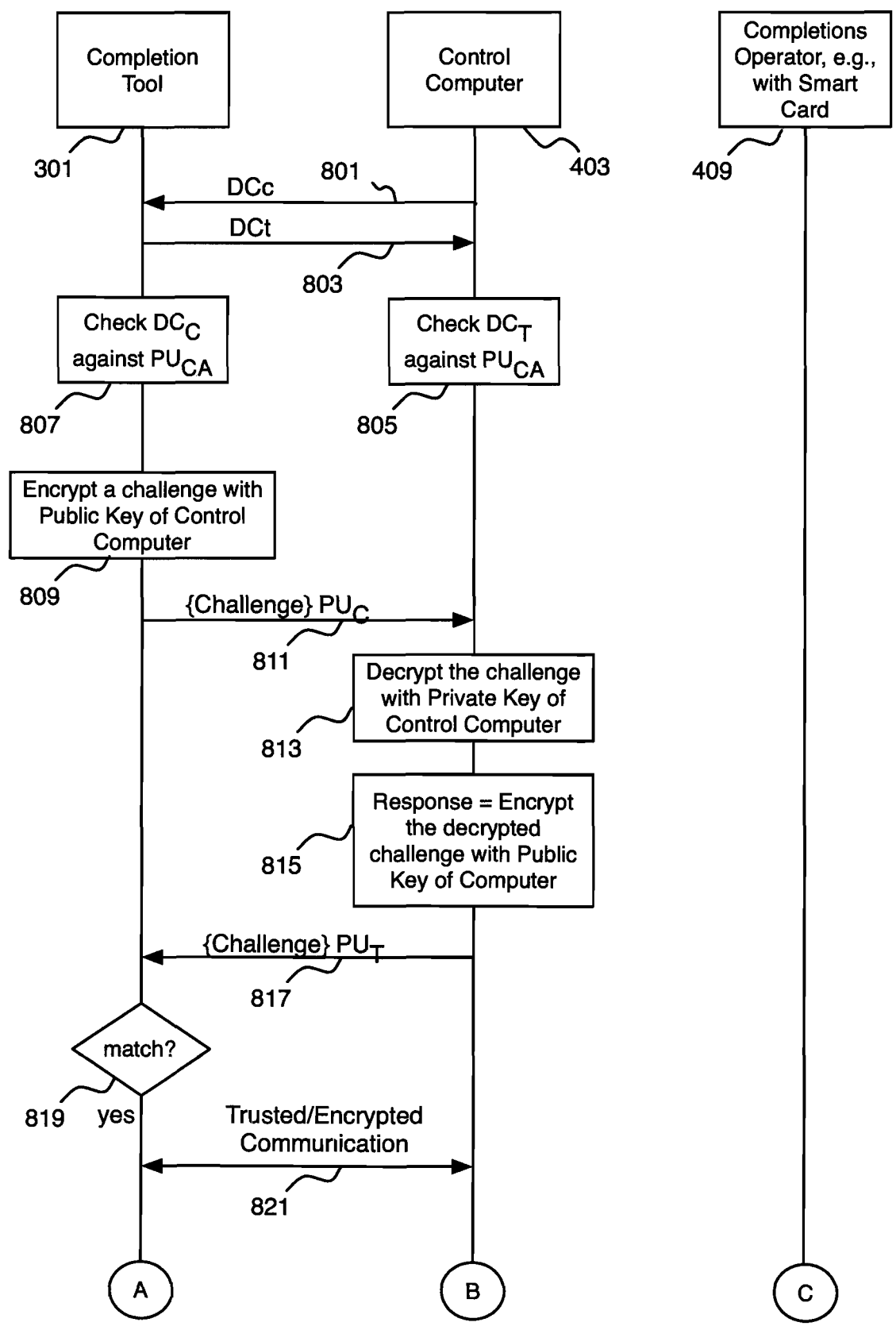
FIGS. 8A and 8B are timing sequence diagrams illustrating the message flow between the completions tool, the control computer, and the completions operator's smart card.
Figure 8B:
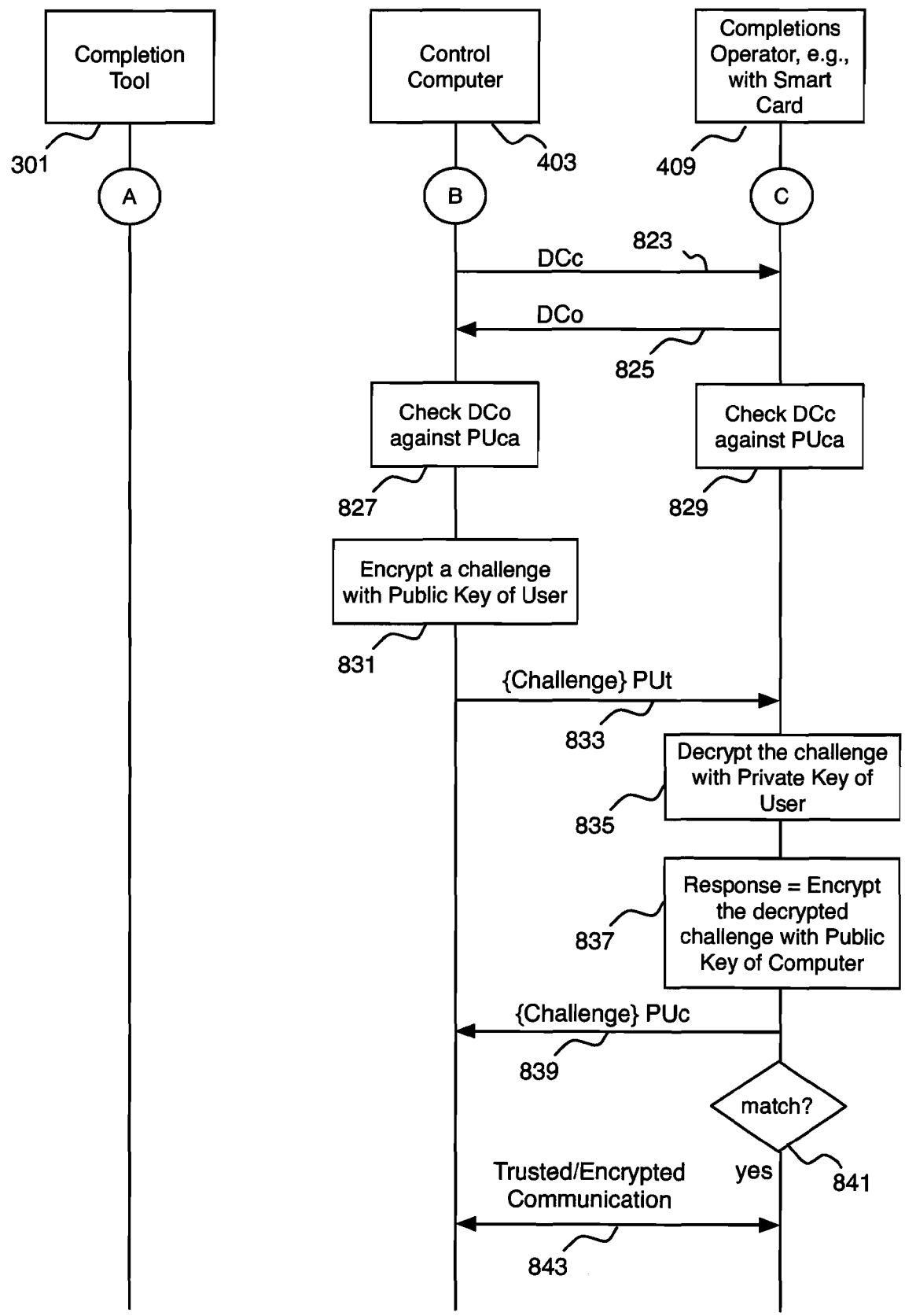

FIGS. 8A and 8B are timing sequence diagrams illustrating the message flow between the completions tool 301, the control computer 403, and the completions operator's smart card 409. As a preliminary step, communications are established between the completions tool 301 and the control computer 403. Over the established communications channel, the control computer 403 and completions tool 301 each transmit its digital certificate to the other, steps 801 and 803.

Next the control computer 403 checks the authenticity of the digital certificate 703 of the completions tool 301 by verifying that the digital certificate 703 has been signed by the CA 411 using its private key, step 805, and the completions tool 301 similarly verifies the authenticity of the digital certificate 701 of the control computer 403, step 807. That a digital certificate has been signed by a specific entity using that entity's private key may be verified using the entity's public key. Because the public key of the CA 411 is stored in each of the completions tool 301 and control computer 403, these entities can verify the authenticity of the digital certificates that they receive.

Next the control computer 403 and completions tool 301 verify the entities presenting the digital certificates are, in fact, the owners of the digital certificates, i.e., that the presented digital certificate allegedly from the completions tool 301 is the actual digital certificate of the completions tool 301, and similarly for the control computer 403. This verification task is termed a "handshake".

To avert an attempt by an unauthorized user using an unauthorized control computer to tamper with the completions tool 301, the completions tool requires the control computer to decrypt a message encrypted with the public key of the control computer 403 (i.e., {Challenge} $PU_C$) and to encrypt the same message with the public key of the completions tool 301 (i.e., {Challenge} $PU_T$). If the challenge message returned from the control computer 403 matches the original challenge string, the handshake has succeeded and the communications channel between the completions tool 301 and control computer may be trusted.

Thus, to verify the identity of the control computer 403, the completions tool encrypts a challenge string using the public key of the control computer 403, step 809. The encrypted challenge string is transmitted to the control computer 403, step 811. The control computer 403 decrypts the challenge string using the private key ($PR_C$) of the control computer 403, step 813. Next the control computer 403 produces a response to the completions tool 301 by encrypting the decrypted challenge using the public key ($PU_T$) of the completions tool 301, step 815, and transmits this result to the completions tool 301, step 817.

Upon receiving the response, the completions tool 301 decrypts the response and compares the original challenge string to the response, step 819. If there is a match, a trusted and encrypted communications channel 821 has been established between the control computer 403 and completions tool 301 wherein both the control computer 403 and completions tool 301 have been authenticated to the other.

To allow a particular person to act as an authorized completions operator with the right to control the completions tool 301, a similar handshake process is carried out between the control computer 403 and the smart card 409 of the completions operator 405.

The control computer 403 and the smart card 409 exchange digital certificates, steps 823 and 825. The control computer 403 and the smart card 409, respectively, verify the authenticity of the received digital certificates against the public key of the CA 411, steps 827 and 829. Next the control computer 403 encrypts a challenge message for the completions operator 405 using the public key ($PU_O$) of the completions operator 405 (i.e., {Challenge}$PU_O$), step 833, and transmits this challenge message to the smart card 409, step 833.

The smart card 409 decrypts the challenge message using the completions operator's private key ($PR_O$), step 835. Next the smart card 409 produces a response to the control computer 403 by encrypting the decrypted challenge using the public key ($PU_C$) of the control computer 403, step 837, and transmits this result to the control computer 403, step 839.

Upon receiving the response, the control computer 403 decrypts the response and compares the original challenge string to the response, step 841. If there is a match, a trusted and encrypted communications channel 843 has been established between the control computer 403 and smart card 409 wherein both the control computer 403 and the smart card 409 (and consequently the completions operator 405) have been authenticated to the other.

With an established trusted and encrypted communications link between the smart card 409 and the control computer 403, and between the control computer 403 and the intelligent completions tool 301, the completions operator 405 can securely control the operation of the completions tool 301. Without establishing such a secure chain of trust, the control computer 403 and the completions tool 301 reject attempts by the completions operator 405 to control the completions tool 301.

While the use of a smart card 409, as discussed herein, enhances the security of the overall operation by adding two-factor authentication to the user and by providing additional protection to the private key ($PR_O$) of the completions operator 405, the functions of the smart card 409 may be provided by another device, e.g., directly by the personal computer 407 of the completions operator 405.

Published patent application 20050108571 to Karen Lu, et al., entitled "Secure networking using a resource-constrained device", filed May 19, 2004, describes a smart card that may act as a peer with other nodes on a computer network. In a preferred embodiment of the invention, the smart card 409 is configured to act as a network peer with the completions tool 301 and control computer 403 wherein secure communications are established end-to-end between the smart card 409 and the control computer 403, for example, in the manner described in published application 20050108571. End-to-end security between the smart card 409 and the control computer 403 avoids security risks associated with having intervening computers that could be vulnerable to attacks such as keyboard loggers or other software designed to illegitimately appropriate information transferred through it, e.g., proprietary software or control parameters.

In an alternative embodiment, the security of the completions tool 405 is further enhanced by partitioning the control program 307 into at least two portions. A first portion that is stored in the firmware of the completions tool 405 and a second portion that is uploaded to the completions tool 405 from either the smart card 409, the control computer 403 or another secure node on the network 401.

Figure 9:
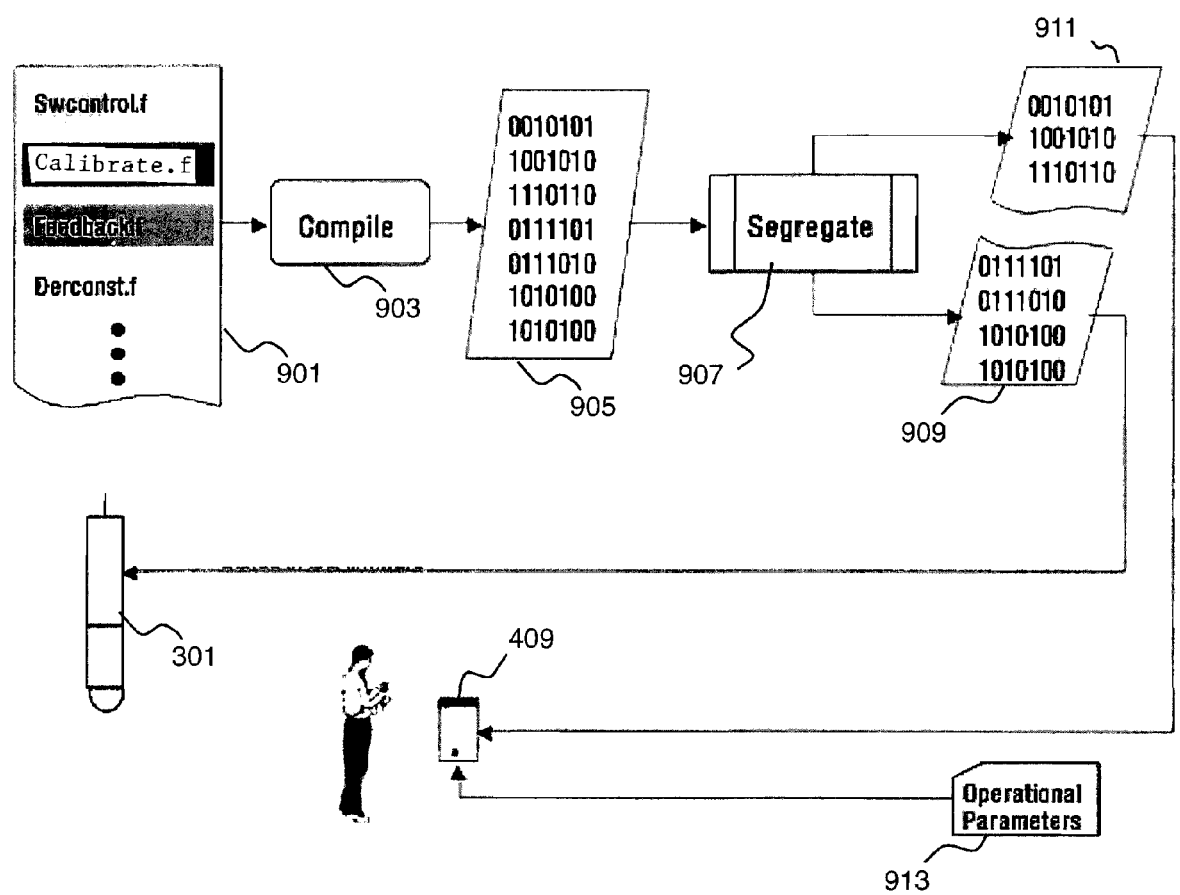
FIG. 9 is a block diagram illustrating the partitioning of the control program into two portions.

FIG. 9 is a block diagram illustrating the partitioning of the control program into two portions. A control program is compiled at process 903 from a collection of source program files 901. The output of the compilation process 903 is at least one executable file 905. A partitioning process 907 divides the executable file 905 into two separate pieces, a first portion 909 to be loaded onto the completions tool 301 and a second portion 911 to be loaded onto the smart card 409 (or another node). To become operational, the second portion 911 may require additional operational parameters 913 loaded onto the smart card 409, for example, control constants. These operational parameters 913 may be pre-stored on the smart card 409 or entered by the completions operator 405.

Figure 10:
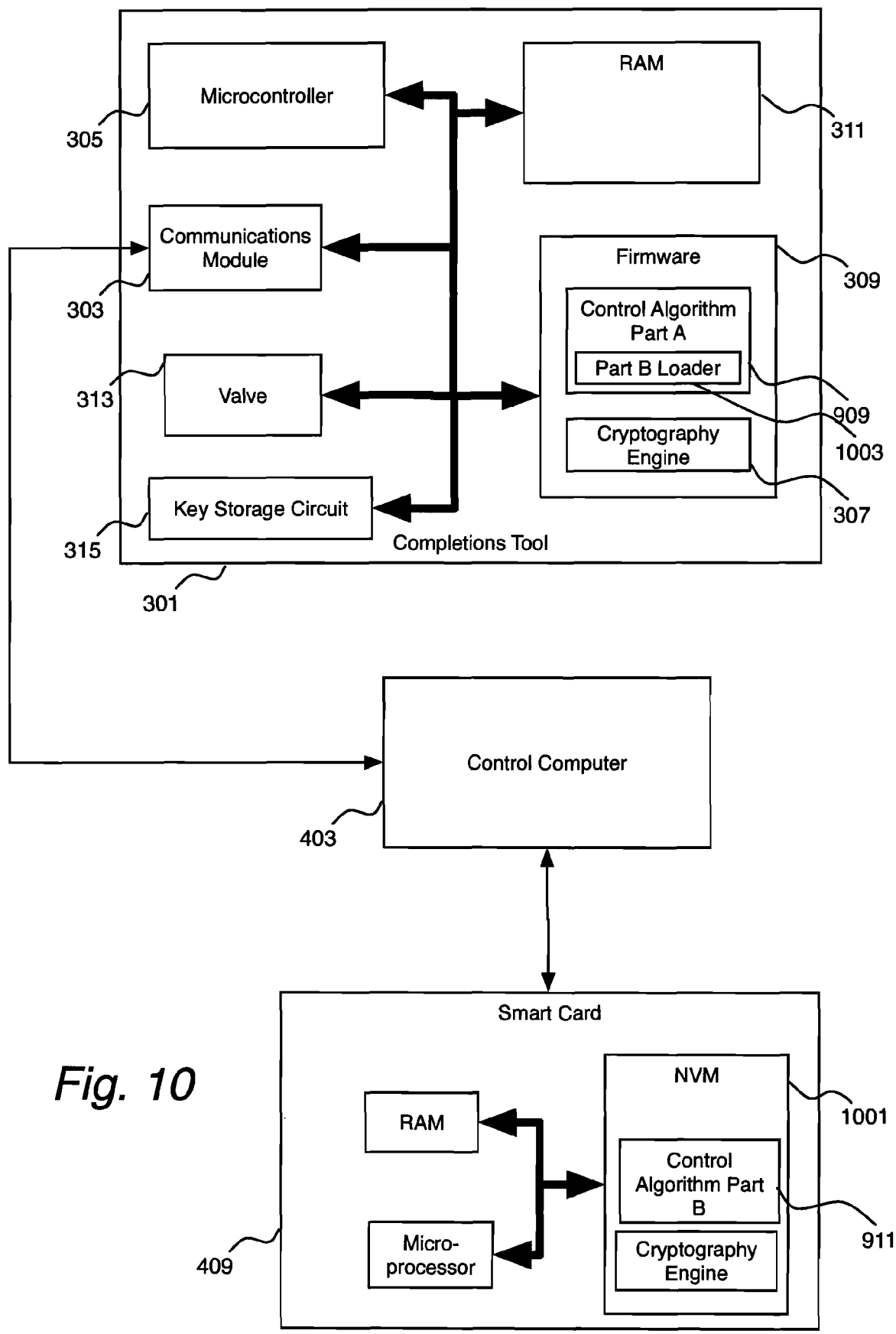
FIG. 10 is a block diagram illustrating the architecture for one embodiment in which the control program is partitioned into two portions.
Figure 11:
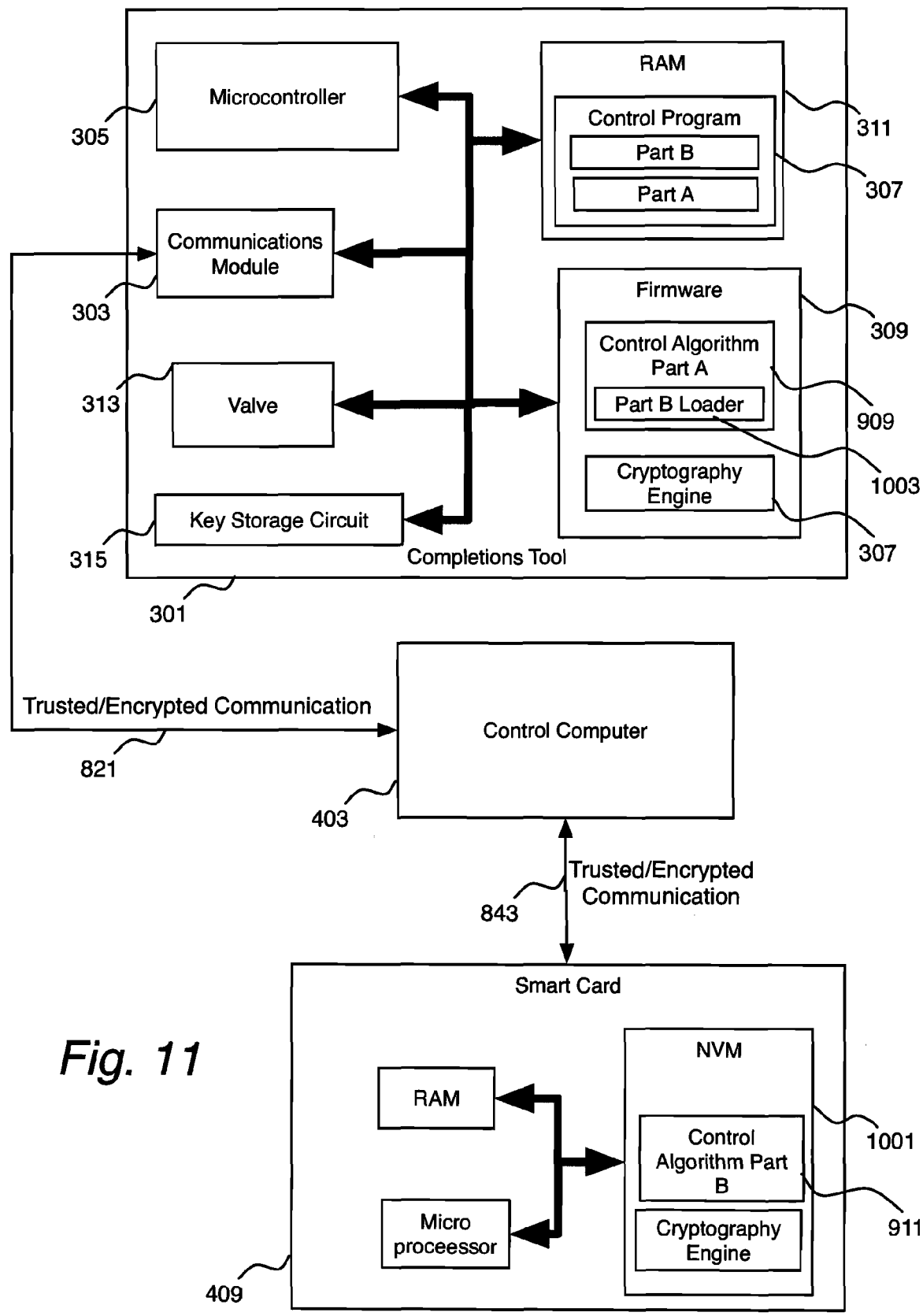
FIG. 11 is a block diagram illustrating the loading of a second portion of the control algorithm into the RAM of the completions tool.

FIG. 10 is a block diagram illustrating the architecture for one embodiment in which the control program is partitioned into two portions. FIG. 11 is a block diagram illustrating the loading of a second portion of the control algorithm into the RAM 311 of the completions tool 301.

The completions tool 301 contains a firmware storage 309 in which the first portion of the control program (Part A) 909 is stored. An initial loading of the first portion 909 may be performed as part of the manufacturing process. Updating the first portion 909 may be performed by a completions operator 405 after successfully establishing the chain of trust as described herein above.

The second portion of the control program (Part B) is stored in a non-volatile memory (NVM) 1001 of the smart card 409.

The control program Part A 909 contains a Part B loader 1003. The Part B loader 1003 consists of logic to perform the merging of the Part A 909 with the second portion obtained by being downloaded from the smart card 409. The completions tool 301, for example, through the Part B loader 1003, establishes a secure connection with the smart card 409 (as described hereinabove) prior to downloading the second portion from the smart card 409. Prior to transmitting the section portion 911 to the completions tool 301 over the secure channel, the smart card 409 encrypts the second portion 911 using the public key ($PU_T$) of the completions tool 301. The completions tool 301 then decrypts the second portion 911 using its private key ($PR_T$) and performs any required operations to merge the first portion 909 with the second portion 911. The second portion loader 1003 stores the combined control program 307 into the RAM 311, which is a volatile memory. In the event the completions tool 301 is tampered with, or if the completions tool 301 or the electronic components of the completions tool 301 are removed, the contents of the RAM 311 are erased. This clearing operation of the RAM 311 renders the control program 307 inoperable because the second portion 911 would not be available. The security of the control program and acquired data, e.g., from theft or inadvertent unauthorized access, is further enhanced by storing control parameters of the control algorithm and any acquired data in the volatile memory RAM 311. When the chain of trust is re-established, the process to download the second portion 911 into the RAM 311 may be re-executed and the completions tool 301 can be reactivated.

In one embodiment, access control features of the completions tool 301, e.g., as part of operating system instructions stored in the firmware 309, control access to the combined control program 307. For example, access control protocols may be established to not allow completions operators read access to the combined control program 307. Such restrictions prevent the combined control program 307 from being impermissibly copied by unauthorized persons after the combined control program 307 has been created by merging the first portion 909 with the second portion 909. Thus, the protections that are achieved by not storing the entire control program in the firmware 309 of the completions tool 301 are maintained even after the combined control program 307 has been created through the merger.

From the foregoing, it will be appreciated that the security system provided by the invention provides an efficient mechanism to secure intelligent completions tools, including their hardware, control algorithm, control parameters and acquired data thus enhancing the overall security of an oilfield operation. Providing such security mechanisms further protects proprietary control algorithms from deliberate theft or inadvertent exposure.

Although specific embodiments of the invention have been described and illustrated, the invention is not to be limited to the specific forms or arrangements of parts so described and illustrated. The invention is limited only by the claims.

We claim:

1. An intelligent completions tool configured to be deployed downhole for controlling fluid flow in a petroleum reservoir, comprising:
    an adjustable valve;
    random access memory; and
    nonvolatile memory including:
    a first portion of a control algorithm; and
    instructions that when executed by a processor, cause the processor to perform acts comprising:
        receiving a digital certificate from a secure node geographically remote from the intelligent completions tool;
        authenticating the digital certificate associated with the secure node;
        accessing the first portion of the control algorithm;
        downloading, based on the authentication, a second portion of the control algorithm from the secure node; and
        creating a control program by merging the first portion of the control algorithm with the second portion of the control algorithm in the random access memory;
        storing the control program in the random access memory; and
        executing the control program, wherein executing the control program comprises:
            receiving, by the control program, one or more parameter values from the secure node; and
            adjusting, by the control program, the adjustable valve in response to the one or more parameter values.

2. The intelligent completions tool of claim 1 wherein receiving the digital certificate from the secure node comprises receiving the digital certificate from one or more of:
    a smart card associated with a user;
    a control computer;
    and further wherein downloading, based on the authentication, the second portion of the control algorithm from the secure node comprises downloading the second portion of the control algorithm from one or more of:
    the smart card associated with the user;
    the control computer.

3. The intelligent completions tool of claim 1 wherein the nonvolatile memory comprises:
    a cryptographic engine operable to use a public key of a certificate authority to verify that the digital certificate associated with the secure node was signed using a private key of the certificate authority; and
    an authentication mechanism further comprising a certificate exchange logic operable to:
    receive the digital certificate associated with the secure node; and
    invoke the cryptographic engine to verify the digital certificate associated with the secure node.

4. The intelligent completions tool of claim 1 wherein the nonvolatile memory further comprises instructions, that when executed by a processor, cause the processor to perform acts comprising:

establishing a chain of trust between the intelligent completions tool and the secure node following the authentication.

5. The intelligent completions tool of claim 1 further comprising an access control mechanism preventing access to the control program.

6. The intelligent completions tool of claim 1 wherein the nonvolatile memory further comprises:
   a cryptographic engine operable to use a public key of a certificate authority to verify that the digital certificate was signed using a private key of the certificate authority; and
   an authentication mechanism comprising a certificate exchange logic operable to receive the digital certificate of the secure node, and authenticate the secure node by invoking the cryptographic engine to verify the digital certificate of the secure node.

7. The intelligent completions tool of claim 6 wherein the certificate exchange logic is further configured to exchange digital certificates with the secure node.

8. The intelligent completions tool of claim 7 wherein the digital certificates include the digital certificate from the secure node and a digital certificate from a completions operator.

9. The intelligent completions tool of claim 8 comprising:
   a flow control activation logic operable to activate the intelligent completions tool once a chain of trust has been established between the intelligent completions tool and the secure node.

10. The intelligent completions tool of claim 7 wherein the certificate exchange logic further comprises:
    a certificate verification logic operable to verify digital certificates received from the secure node using a public key of the certificate authority.

11. The intelligent completions tool of claim 1 wherein the downloading, based on the authentication, a second portion of the control algorithm from the secure node proceeds once a chain of trust has been established between the intelligent completions tool and the secure node.

12. A non-transitory computer-readable storage medium with instructions stored thereon that, when executed, direct a processor of a flow control apparatus to perform acts comprising:
    receiving a digital certificate from a secure node geographically remote from the flow control apparatus;
    authenticating the digital certificate associated with the secure node;
    accessing a first portion of a control algorithm from nonvolatile memory of the flow control apparatus;
    downloading, based on the authentication, a second portion of the control algorithm from the secure node;
    creating a control program by merging the second portion of the control algorithm with the first portion of the control algorithm;
    storing the control program in volatile memory on the flow control apparatus; and
    executing the control program, wherein executing the control program comprises:
        receiving, by the control program, one or more parameter values from the secure node; and
    adjusting, by the control program, an adjustable valve of the flow control apparatus in response to the one or more parameter values.

13. The non-transitory computer-readable storage medium of claim 12, further including instructions to direct a processor to perform acts comprising:
    authenticating the digital certificate by verifying that the digital certificate was signed using a private key of a certificate authority.

14. The non-transitory computer-readable storage medium of claim 12, further including instructions to direct a processor to perform acts comprising:
    preventing updates to a parameter storage on the flow control apparatus until the secure node has been authenticated.

15. The non-transitory computer-readable storage medium of claim 14, further including instructions to direct a processor to perform acts comprising:
    authenticating a completions operator associated with the secure node and preventing parameter updates until the completions operator has been authenticated.

16. The non-transitory computer-readable storage medium of claim 12, further including instructions to direct a processor to perform acts comprising:
    verifying that a control computer corresponds to a trusted secure node by verifying a preprogrammed id associated with the control computer.

17. The non-transitory computer-readable storage medium of claim 12, further including instructions to direct a processor to perform acts comprising:
    authenticating the digital certificate associated with the secure node by verifying the digital certificate was signed by a certificate authority.

18. The non-transitory computer-readable storage medium of claim 17, further including instructions to direct a processor to perform acts comprising:
    exchanging digital certificates with the secure node.

19. The non-transitory computer-readable storage medium of claim 12, further including instructions to direct a processor to perform acts comprising:
    erasing contents of the volatile memory when tampering of the flow control apparatus is detected.

20. The non-transitory computer-readable storage medium of claim 12, further including instructions to direct a processor to perform acts comprising:
    erasing contents of the volatile memory when electronics in the flow control apparatus are removed from the flow control apparatus.

* * * * *